United States Patent
Tamura et al.

[19]

[11] Patent Number: 5,822,630
[45] Date of Patent: Oct. 13, 1998

[54] VIEWFINDER SYSTEM AND OPTICAL APPARATUS

[75] Inventors: Susumu Tamura, Sagamihara; Takanori Honda, Yokohama, both of Japan

[73] Assignee: Canon Kabushiki Kaisha, Tokyo, Japan

[21] Appl. No.: 899,875

[22] Filed: Jul. 24, 1997

[30] Foreign Application Priority Data

Jul. 31, 1996 [JP] Japan .................................. 8-216895

[51] Int. Cl.⁶ ................................................. G03B 17/20
[52] U.S. Cl. ......................... 396/296; 396/373; 396/378
[58] Field of Search .................................. 396/296, 373, 396/378; 348/341

[56] References Cited

U.S. PATENT DOCUMENTS 5,708,882  1/1998  Yokonuma et al. ................. 396/296

*Primary Examiner*—W. B. Perkey
*Attorney, Agent, or Firm*—Robin, Blecker & Daley

[57] ABSTRACT

A viewfinder system includes an optical system for guiding, to an observer, light coming from an object, a liquid crystal display of transmission type provided in an optical path of the optical system, the liquid crystal display having transmittances which differ with wavelengths, and a transmittance uniforming coating provided in the optical path of the optical system, the transmittance uniforming coating making, substantially uniform irrespective of wavelengths, transmittances of light which has passed through the optical system and the liquid crystal display.

16 Claims, 4 Drawing Sheets

ID SYSTEM AND OPTICAL
VIEWFINDER SYSTEM AND OPTICAL APPARATUS

BACKGROUND OF THE INVENTION

1. Field of the Invention

The present invention relates to a viewfinder system and an optical apparatus, such as a camera, using the viewfinder system.

2. Description of Related Art

Recently, there have been put on the market and have been known a number of cameras each of which has a transmission type liquid crystal display built in an optical path of a viewfinder thereof so as to provide, within a view field of the viewfinder, a superimposed display indicative of a photographing range obtained by changing the aspect ratio at the time of panorama photography or the like or indicative of an AF in-focus mark or the like. For the transmission type liquid crystal display serving as a display means, use is made of, for example, a guest-host type of liquid crystal display. In the guest-host type of liquid crystal display, a dichroic dye (guest) which is high in transmittance and which has an anisotropic property in absorbing the visible light with respect to the major and minor axes of molecules is dissolved in a liquid crystal (host) serving as the solvent, and a display is provided by using a variation in light absorption coefficients due to the anisotropy of the dye by controlling the orientation of the molecules of the liquid crystal with electric current supplied, causing a simultaneous change of the orientation of the molecules of the dye.

However, in a case where the guest-host type liquid crystal display is disposed in the optical path of the viewfinder, the color characteristic due to the transmittance characteristic of the dichroic dye affects the colors of the viewfinder image, so that a problem arises in that the viewfinder gives an uncomfortable impression as the viewfinder image is fully stained with extremely different colors from those of the object seen by the naked eye.

BRIEF SUMMARY OF THE INVENTION

An object of the invention is to provide a viewfinder system which employs a guest-host type liquid crystal display or like light modulating means of the transmission type, while still permitting the viewfinder image to be observed at a high quality without the stained colors.

To attain the above object, in accordance with an aspect of the invention, there is provided a viewfinder system, which comprises an optical system for guiding, to an observer, light coming from an object, light modulating means of transmission type provided in an optical path of the optical system, the light modulating means having transmittances which differ with wavelengths, and transmittance uniforming means provided in the optical path of the optical system, the transmittance uniforming means making, substantially uniform irrespective of wavelengths, transmittances of light which has passed through the optical system and the light modulating means.

Further, in accordance with another aspect of the invention, there is provided an optical apparatus, which comprises an objective system, and a viewfinder system, the viewfinder system comprising an optical system for guiding, to an observer, light coming from an object and taken in by the objective system, light modulating means of transmission type provided in an optical path of the optical system, the light modulating means having transmittances which differ with wavelengths, and transmittance uniforming means provided in the optical path of the optical system, the transmittance uniforming means making, substantially uniform irrespective of wavelengths, transmittances of light which have passed through the optical system and the light modulating means.

These and other objects, features and advantages of the invention will become apparent from the detailed description of a preferred embodiment thereof taken in conjunction with the accompanying drawings.

DETAILED DESCRIPTION OF THE INVENTION

Hereinafter, a preferred embodiment of the invention will be described in detail with reference to FIGS. 1 to 4.

Figure 1:
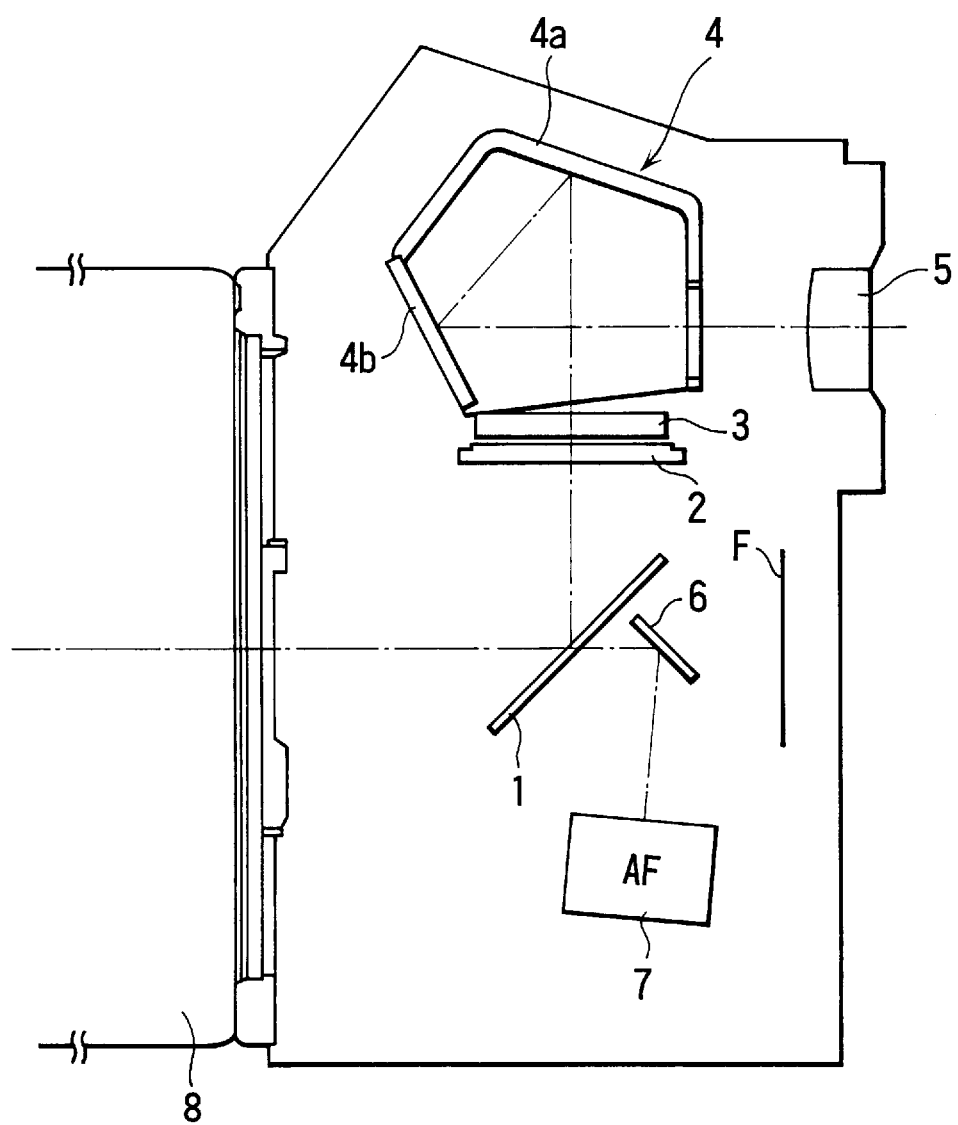
FIG. 1 is a sectional view showing the main parts of a camera having a viewfinder system according to an embodiment of the invention.

FIG. 1 is a sectional view showing the main parts of a camera having a viewfinder system according to the embodiment of the invention.

Referring to FIG. 1, light coming (reflected) from an object to be photographed enters a photographic lens 8 (objective system) and advances to a half-mirror 1. Then, the light is guided by the half-mirror 1 toward a viewfinder system except when a film F serving as a recording medium is actually exposed to the light. After having been reflected from the half-mirror 1, the object light forms an image on a focusing screen 2. A guest-host type liquid crystal display 3 serving as a transmission type display means is arranged to provide, within a view field of the viewfinder system, a superimposed display indicative of an AF in-focus mark or a photographing range obtained by the operation of an aspect ratio changing switch (not shown). The object image formed on the focusing screen 2 is converted into an erecting image by an erecting image forming optical member 4 serving as an image converting means. The erecting image forming optical member 4 is provided with a roof mirror 4a formed by the molding technique and having a reflection coating, and an e-face mirror 4b as the final reflecting surface arranged to guide the object image erected by the roof mirror 4a into a direction coincident with an optical axis of an eyepiece lens 5. The e-face mirror 4b is made up by applying a reflection coating to a glass plate.

The eye-piece lens 5 is arranged to guide the object image to an eyepoint (observer's pupil) and is formed by the molding technique. Further, as the object light is split off by the half-mirror 1, a light beam which has passed through the half-mirror 1 without being reflected therefrom advances to a sub-mirror 6 to be guided to an AF (auto-focus) device 7. The AF device 7 is arranged to bring the photographic lens 8 into an infocus state in accordance with the degree of defocus of the object image.

Figure 2:
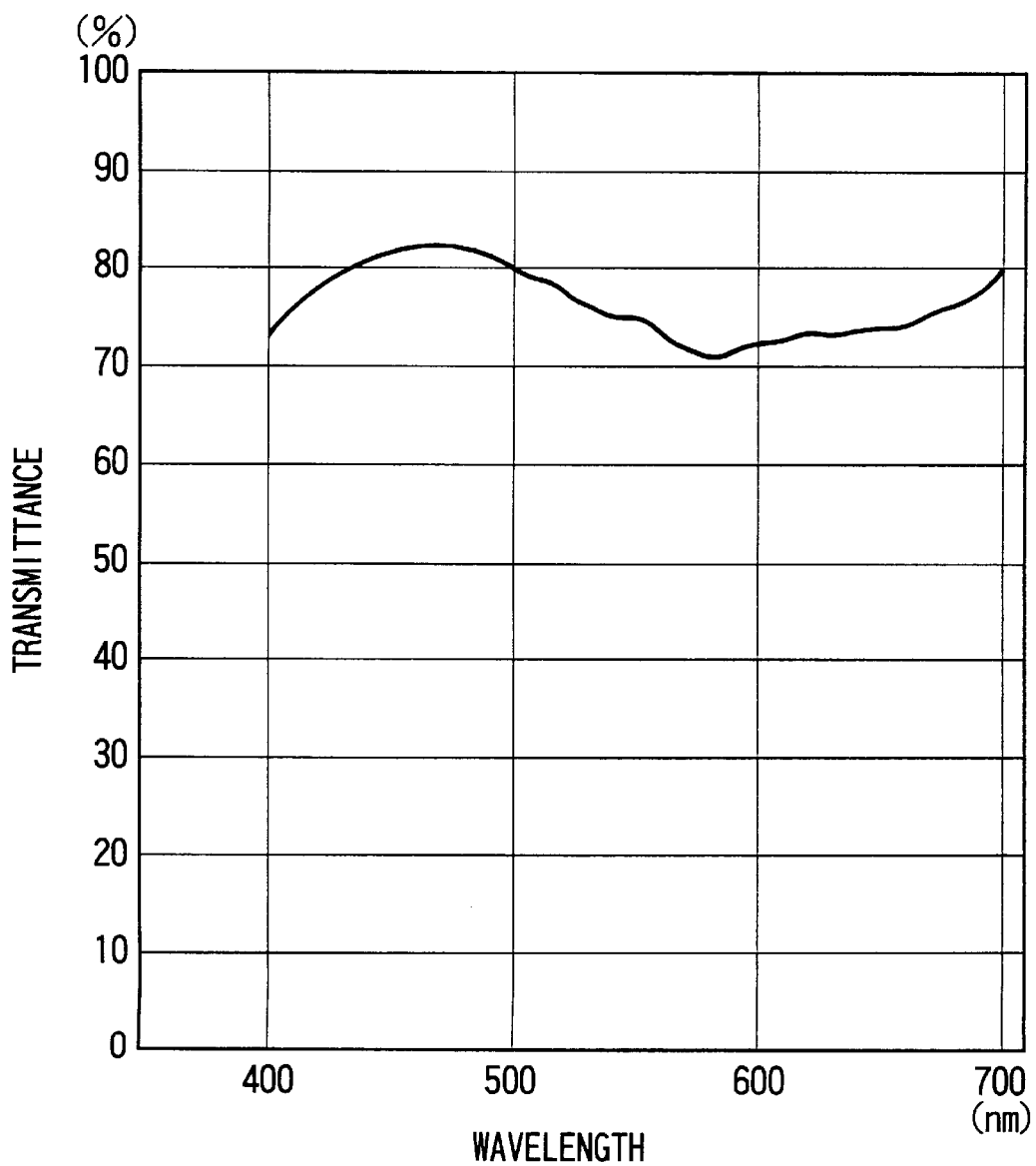
FIG. 2 is a graph showing the transmittance characteristic of a guest-host type liquid crystal display 3.
Figure 3:
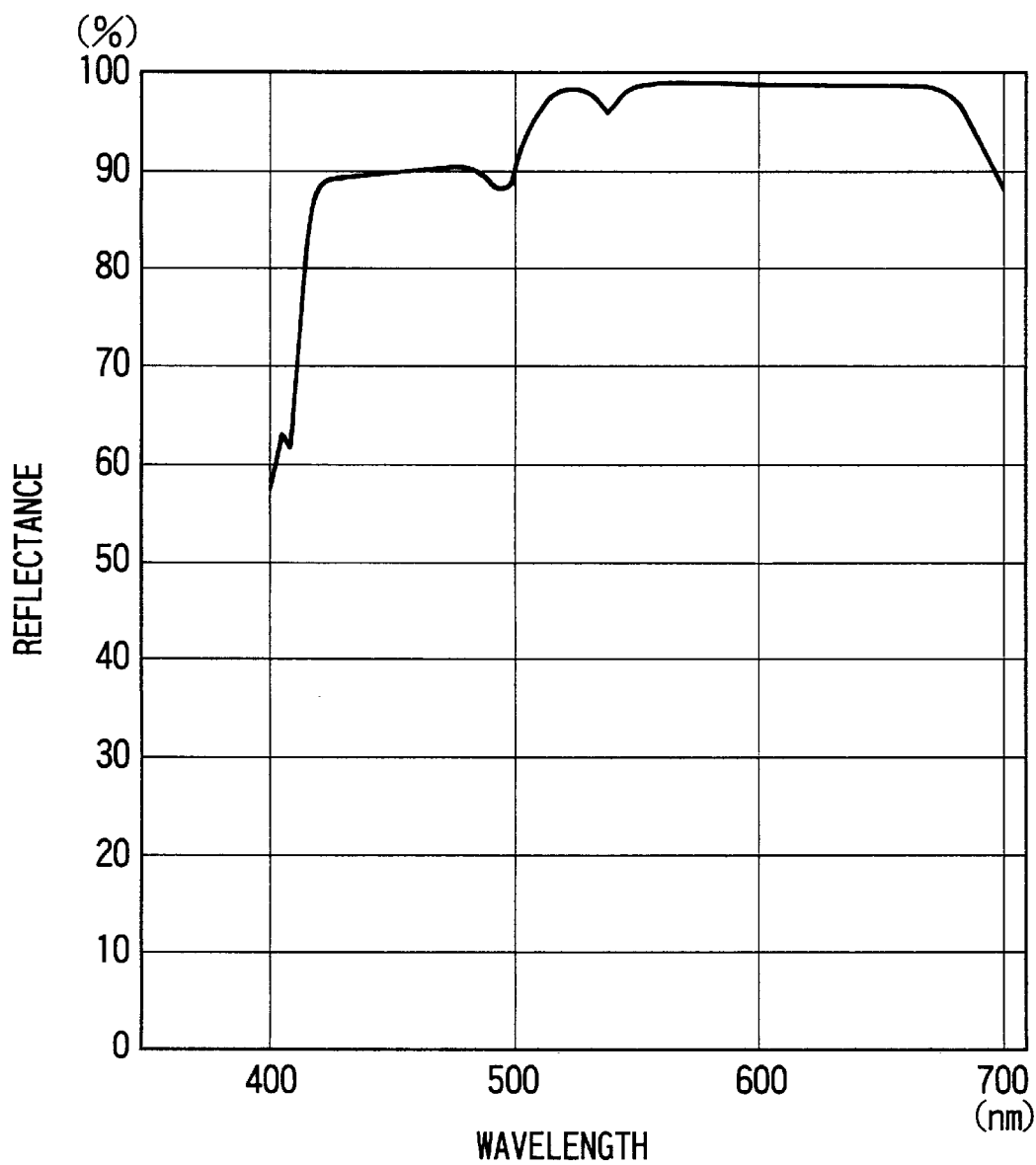
FIG. 3 is a graph showing the reflectance characteristic of an e-face mirror 4b.

FIG. 2 is a graph showing a transmittance characteristic, relative to wavelengths of light, of the guest-host type liquid crystal display 3 incorporated in the camera as described above. Similarly, FIG. 3 is a graph showing a reflectance characteristic, relative to wavelengths of light, of the e-face mirror 4b which is the final reflecting surface of the erecting image forming optical member 4. Also, FIG. 4 is a graph showing a transmittance characteristic, relative to wavelengths of light, of the entirety of the viewfinder system, which coincides with the spectrum of light as seen by the photographer who looks through the eyepiece lens 5, that is, the viewfinder.

Figure 4:
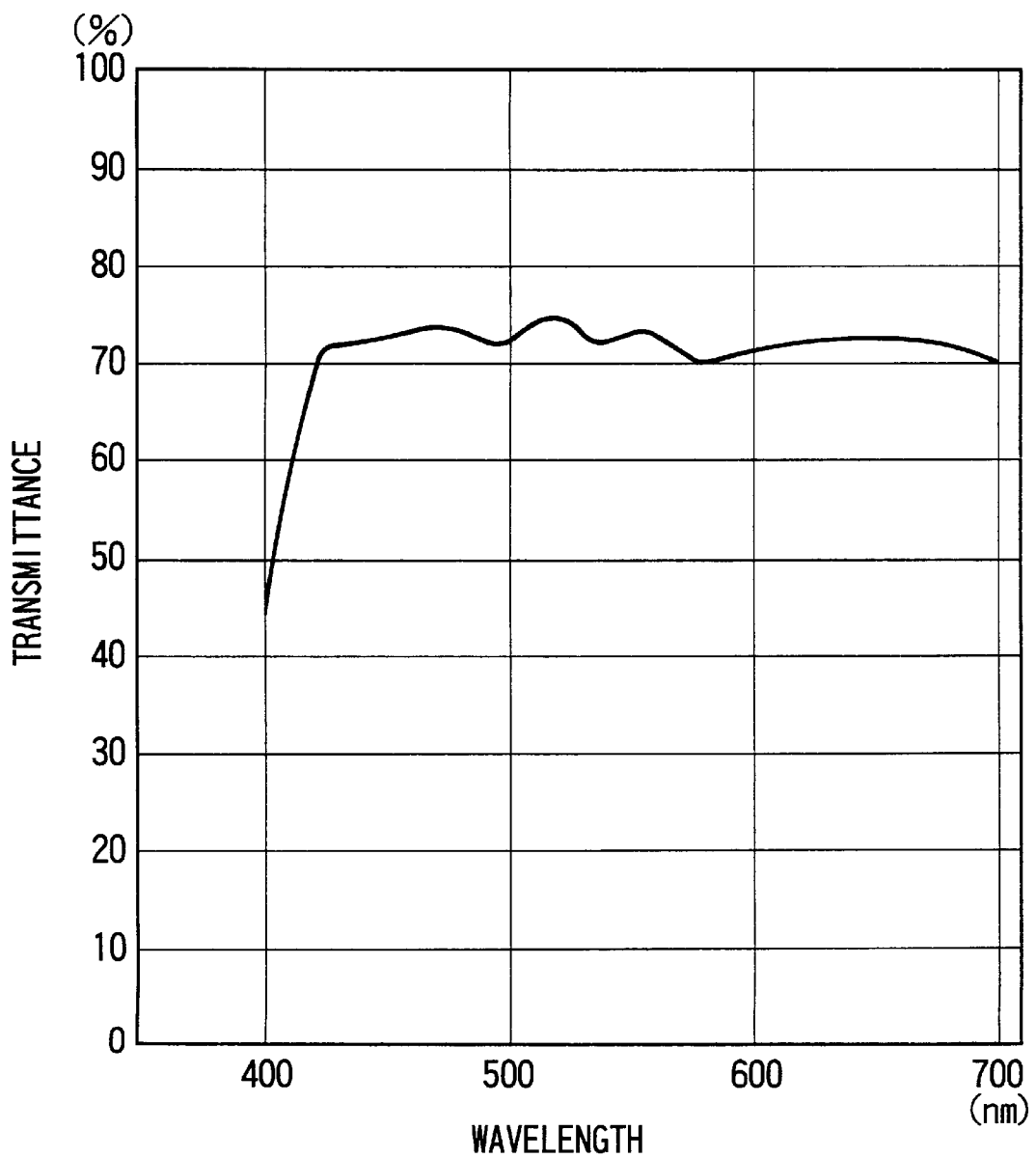
FIG. 4 is a graph showing the transmittance characteristic of the entirety of the viewfinder system.

In each of FIGS. 2 to 4, the abscissa axis indicates wavelengths of light ranging from 400 nm to 700 nm, usually called the "visible light", and the ordinate axis indicates transmittance or reflectance in percent.

In the viewfinder system configured as described above according to the embodiment, a photographing light beam entering at the photographic lens 8 is reflected from the half-mirror 1, then, passes through the focusing screen 2 and the guest-host type liquid crystal display 3 with the selected aspect ratio or the AF in-focus mark displayed therein, and, then, enters the erecting image forming optical member 4, thereby forming a viewfinder image. However, since the transmittance characteristic, relative to wavelengths of light, of the guest-host type liquid crystal display 3 has such a feature that, in contrast to a wavelength of 550 nm for which the sensitivity of the human eye is usually said to be highest, a short wavelength (blue) region of 400 nm to 500 nm has a higher intensity, as shown in FIG. 2, the light which has passed through the guest-host type liquid crystal display 3 is considerably strong in blue color. If that light is left without making any compensation, the viewfinder image would become rich in the blue shade, thus depriving the viewfinder system of the high class feeling.

Therefore, in the viewfinder system according to the embodiment of the invention, the object light, after having been reflected from the roof mirror 4a, is corrected in the spectral intensities by the e-face mirror 4b. For this purpose, the e-face mirror 4b is provided with a multilayer coating (because the mono-layer coating is unable to partly decrease and partly increase the reflectance), which, as shown in FIG. 3, has a totally high reflectance of 98% relative to a wavelength of 550 nm for which the sensitivity of the human eye is usually said to be highest, and has reflectances relative to wavelengths of 400 nm to 500 nm lower than reflectances relative to wavelengths of 500 nm to 700 nm.

Accordingly, the object light reflected from the e-face mirror 4b, after passing through the eyepiece lens 5, exhibits flat or uniform transmittances in the region of wavelengths of 400 nm to 700 nm, as shown in FIG. 4. Thus, the viewfinder image can be made not to be stained by a particular color, giving such an image that the photographer perceives when looking at the object directly by his or her naked eyes.

Further, a part of the photographing light beam passes through the half-mirror 1 and is guided by the sub-mirror 6 to the AF device 7. When the photographer pushes a shutter release button (not shown) to its half stroke, the AF device 7 moves a focusing lens in the photographic lens 8 so as to perform focus adjustment to bring the object image in focus. After the in-focus state is established, the guest-host type liquid crystal display 3 provides a display indicative of the AF in-focus mark in the view field of the viewfinder system.

When the photographer further pushes the shutter release button to its full stroke, the half-mirror 1 retracts from the optical path and the sub-mirror 6, too, retracts from the optical path in association with the movement of the half-mirror 1. Then, in such a condition, a shutter curtain (not shown) is operated to expose the film F to the object light.

It will be appreciated from the foregoing that, according to the embodiment of the invention, the transmittance characteristic peculiar to the guest-host type liquid crystal display 3 is compensated so that the viewfinder system as a whole exhibits a flat transmittance characteristic. To this purpose, the multilayer reflection coating is applied to the reflecting surface of the e-face mirror 4b. Therefore, it is made possible to prevent the viewfinder image from being stained by colors without lowering the brightness.

In addition, in the embodiment described above, the e-face mirror 4b of the erecting image forming optical member 4 has been made to serve as a transmittance uniforming means in the invention. However, in the invention, the transmittance uniforming means may take another place in the viewfinder system. For example, the roof mirrors 4a may be selected to make up the transmittance uniforming means as a multilayer reflection coating. Otherwise, the eyepiece lens 5 may be selected to apply a multilayer transmittance coating. Anywhere may be otherwise selected provided that the transmittance of the entirety of the viewfinder system can be made substantially uniform.

We claim:

1. A viewfinder system comprising:

an optical system for guiding, to an observer, light coming from an object;

light modulating means of transmission type provided in an optical path of said optical system, said light modulating means having transmittances which differ with wavelengths; and transmittance uniforming means provided in the optical path of said optical system, said transmittance uniforming means making, substantially uniform irrespective of wavelengths, transmittances of light which has passed through said optical system and said light modulating means.

2. A viewfinder system according to claim 1, wherein said transmittance uniforming means includes a multilayer coating.

3. A viewfinder system according to claim 2, wherein said multilayer coating includes a reflection coating.

4. A viewfinder system according to claim 2, wherein said multilayer coating includes a transmission coating.

5. A viewfinder system according to claim 1, further comprising:

image converting means provided in the optical path of said optical system, said image converting means converting an image of the object in said optical system into an erecting image, wherein said transmittance uniforming means includes a coating provided on said image converting means.

6. A viewfinder system according to claim 5, wherein said image converting means has an erecting image forming reflecting surface and a final reflecting surface, and wherein said coating is provided on said final reflecting surface.

7. A viewfinder system according to claim 6, wherein said coating exhibits such a reflectance characteristic that reflectances relative to a region of wavelengths in which transmittances of said light modulating means are relatively high is relatively low, and reflectances relative to a region of wavelengths in which transmittances of said light modulating means are relatively low is relatively high.

8. A viewfinder system according to claim 1, wherein said light modulating means includes a guest-host type liquid crystal display.

9. An optical apparatus comprising:

an objective system; and a viewfinder system, said viewfinder system comprising:
an optical system for guiding, to an observer, light coming from an object and taken in by said objective system;
light modulating means of transmission type provided in an optical path of said optical system, said light modulating means having transmittances which differ with wavelengths; and
transmittance uniforming means provided in the optical path of said optical system, said transmittance uniforming means making, substantially uniform irrespective of wavelengths, transmittances of light which has passed through said optical system and said light modulating means.

10. An optical apparatus according to claim 9, wherein said transmittance uniforming means includes a multilayer coating.

11. An optical apparatus according to claim 10, wherein said multilayer coating includes a reflection coating.

12. An optical apparatus according to claim 10, wherein said multilayer coating includes a transmission coating.

13. An optical apparatus according to claim 9, further comprising:
image converting means provided in the optical path of said optical system, said image converting means converting an image of the object formed by said objective system into an erecting image,
wherein said transmittance uniforming means includes a coating provided on said image converting means.

14. An optical apparatus according to claim 13, wherein said image converting means has an erecting image forming reflecting surface and a final reflecting surface, and wherein said coating is provided on said final reflecting surface.

15. An optical apparatus according to claim 14, wherein said coating exhibits such a reflectance characteristic that reflectances relative to a region of wavelengths in which transmittances of said light modulating means are relatively high is relatively low, and reflectances relative to a region of wavelengths in which transmittances of said light modulating means are relatively low is relatively high.

16. An optical apparatus according to claim 9, wherein said light modulating means includes a guest-host type liquid crystal display.

* * * * *